United States Patent

[11] 3,596,541

[72] Inventor Zdzislaw Bieganski
c/o Apem Works, St. Albans Road,
Watford, Hertfordshire, England
[21] Appl. No. 772,101
[22] Filed Oct. 31, 1968
[45] Patented Aug. 3, 1971
[32] Priority Nov. 4, 1967
[33] Great Britain
[31] 50228/67

[54] WIRE STRIPPING TOOLS
3 Claims, 5 Drawing Figs.

[52] U.S. Cl................................................ 81/9.5 A,
29/200 H, 29/203 H, 30/90.1, 30/304
[51] Int. Cl........................................................ H02g 1/12,
B23p 19/04, B26b 17/02
[50] Field of Search............................................ 81/9.5,
9.51; 29/200 H, 203 H; 30/90.1, 304, 305; 83/1,
697; 146/2, 4, 43—44, 130, 147, 203, 14

[56] References Cited
UNITED STATES PATENTS

| | | | |
|---|---|---|---|
| 1,274,663 | 8/1918 | Auer | 146/203 |
| 893,132 | 7/1908 | Bork | 81/9.5 (M) |
| 1,633,365 | 6/1927 | Ebmeier | 146/4 |
| 1,680,372 | 8/1928 | Fenn | 81/9.51 X |
| 2,334,577 | 11/1943 | Postlewaite | 30/90.1 X |
| 2,335,150 | 11/1943 | Johnson | 30/305 X |
| 2,364,380 | 12/1944 | Marek | 53/362 |
| 2,435,660 | 2/1948 | Tileston | 81/9.51 X |
| 2,654,282 | 10/1953 | Emmett | 81/356 |
| 2,655,721 | 10/1953 | Elnhorn | 30/304 X |
| 3,422,708 | 1/1969 | Bieganski | 81/9.5 (A) |
| 3,416,227 | 12/1968 | McDonald | 30/351 X |

FOREIGN PATENTS

| | | | |
|---|---|---|---|
| 162,492 | 3/1949 | Austria | 146/4 |
| 784,300 | 7/1935 | France | 30/304 |
| 1,349,520 | 12/1963 | France | 81/9.51 |
| 1,102,842 | 3/1961 | Germany | 81/9.5 |

OTHER REFERENCES

Bowra, D. J., " Wire Stripper," Dec. 7, 1966, pp. 782—783, IBM Technical Disclosure Bulletin (copy in 81/9.5) (Vol. 9, No. 7)

Primary Examiner—Wayne A. Morse, Jr.
Attorney—Kurt Kelman

ABSTRACT: The invention provides a wire stripping tool having cutting blades for part-severing the sheath which is to be stripped from the wire, each blade being fabricated of a set of laminations in face-to-face contact so that the laminations can collectively accommodate themselves to the cross-sectional shape of the cable to achieve a better cut.

INVENTOR:
ZDZISLAW BIEGANSKI

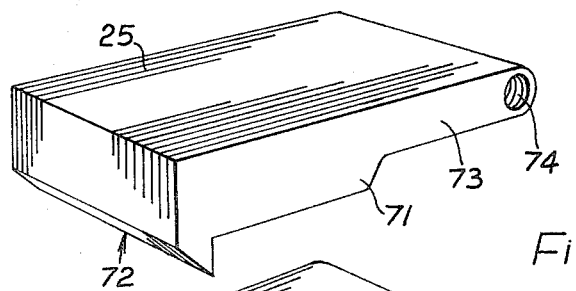
Fig. 2.
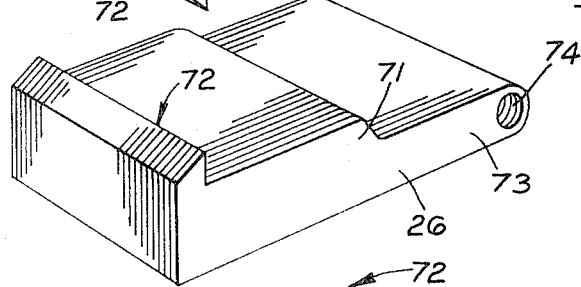
Fig. 3.
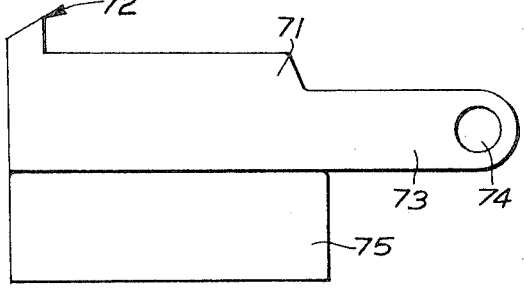
Fig. 4.
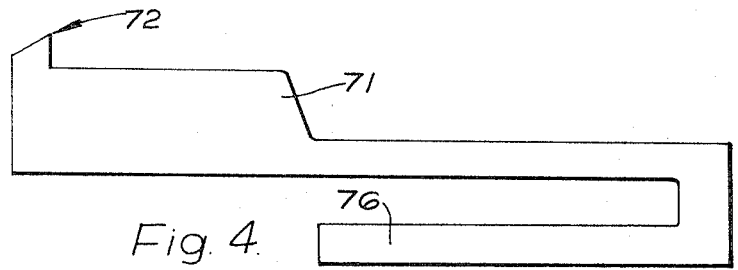
Fig. 5.
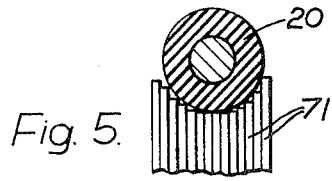

WIRE STRIPPING TOOLS

This invention relates to tools for stripping the sheath from sheathed cables and the like for example the insulating covering from an electric conductor so as to bare the wire for connection purposes.

It is usual in such tools to provide a pair of parallel cutting edges which are moved together to part-sever the sheath, following which the cutting edges are moved relatively to the core of the cable or the like (or vice versa) so as to tear the sheath between the two cuts formed by the edges, and strip an end portion of the sheath from the core.

The objects of the present invention are to provide improvements in tools of this kind.

According to the present invention a wire stripping tool is provided with at least one cutting jaw which comprises a plurality of parallel blade laminae each having a cutting edge, and being relatively movable, thereby providing a jaw cutting edge of variable configuration, and the blades being resiliently urged.

The resilient means may comprise a spring or preferably a block of resilient material such as rubber, and may urge the blades towards positions in which the composite edge is straight.

One tool embodying the present invention is now described with reference to the accompanying drawings, wherein:

FIG. 2 is a perspective view of the blade assembly forming part of the same;

FIG. 3 is a side elevation of one blade;

FIG. 4 shows a modification; and

FIG. 5 is a scrap cross-sectional view showing the blade assembly in cutting configuration.

Figure 1:
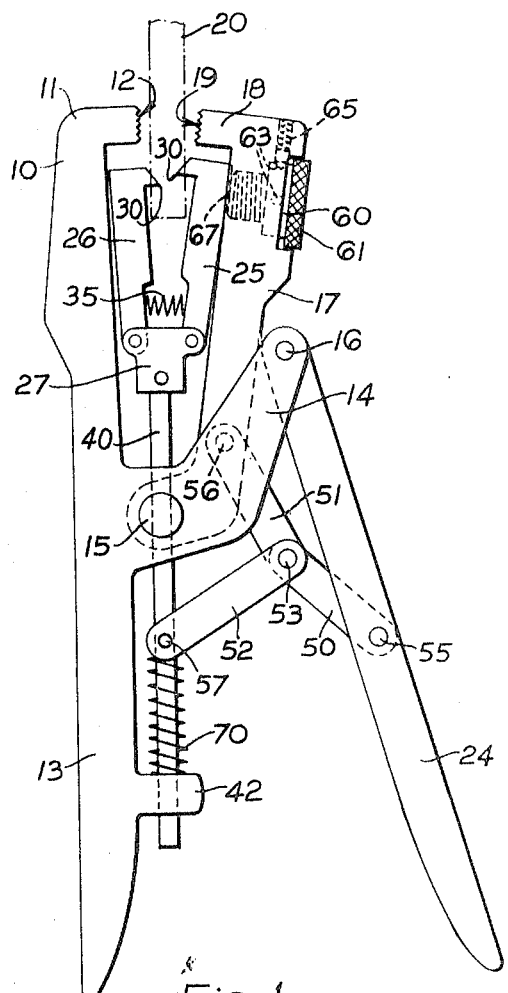
FIG. 1 is an elevation of cable sheath stripping tool.

Referring to the drawings and to FIG. 1 thereof, the tool shown therein comprises a substantially straight rigid member forming at one end portion a jaw 10 provided with an inwardly directed extension 11 at its free end, one face of the projection being serrated at 12.

The rigid member also extends to form a first handle 13.

Substantially midway along its length the member is provided with a lateral extension 14 which locates a pair of pivots 15, 16. A second jaw 17 provided with an inwardly directed extension 18 having a serrated surface 19 is pivoted at pivot 15 for movement between the illustrated position and the position more closely adjacent the jaw 10 whereby a cable or the like shown in chain-dot lines at 20 inserted between the two serrated faces 12 and 19 may be gripped by those faces between the jaws.

A lever handle 24 is pivoted on the pivot 16 for movement towards the handle portion 13 and for effecting closure of the jaws and other operations as will be more particularly described hereinafter.

Located between the jaws 10 and 17 is a second pair of jaws (hereinafter more particularly described) 25, 26 pivoted on a block 27. Each of the jaws 25, 26 is provided integrally or as an attachment with an inwardly directed cutting edge 30 and one jaw is slightly longer than the other so that when the jaws 25, 26 are closed together one portion 30 slides over the other portion 30 and the V-notches or other means may cut into the cable sheath 30 to part-sever the sheath. Alternatively, the edges 30 may meet edge-to-edge.

Each of the jaws 25, 26 is guided for sliding movement relative to the length of the corresponding adjacent jaw 10 or 17.

The jaws 25, 26 are spring urged apart by a small compression spring 35 lying between the adjacent faces of the jaws 25, 26.

The block 27 is fast with a rod 40 which extends through a transverse bore in the pivot 15 and also through a coaxial bore in a projection 42 from the handle portion 13. This guides the rod 40 for axial sliding movement.

The jaw 17, the rod 40 and the handle 24 are connected by a three link toggle device comprising links 50, 51, 52 all of which are pivoted together at a common knee 53 and at their respective free ends are pivoted at 55 to the handle 24, at pivot 56 to the jaw 17 and at pivot 57 to the rod 40.

It is convenient to make extension 14 with parallel limbs so as to leave a space between them to house the jaw 17 for free pivotal movement about the pivot 15 and similarly to fulcrum the handle 24. The jaw 17 may itself be slotted to accommodate link 51 and allow free pivoting of the latter about the point 56, as may the handle 24 to allow free pivoting of the link 50 about the pivot 55.

The inner jaw 26 is spaced from the cooperating channel surface of the pivot jaw 17 by a variable amount by means of an adjustment screw 60. The screw has a milled head 61 and a neck provided with a plurality, conveniently four, peripherally spaced shallow blind holes or recesses, and a spring loaded detent 65 is located in the free end of the jaw 17 as shown by the dotted line 65 and this detent is urged resiliently into engagement with any one of the recesses 63 according to the angular position of the screw.

The shank 66 of the screw is threaded and engages in cooperating threads in the jaw 17.

By turning the head 61 a different recess 63 is engaged with the detent 65 and because the angular movement advances the free end 67 of the screw into contact with and displaces the jaw 25, the relative positions of the cutting portion 30 and the gripping portion 19 respectively are varied.

Each cutting jaw 25, 26 comprises a pack of cutting blades 71 each blade of substantially rectangular shape and having a cutting edge 72 projecting from one side thereof. At the opposite corner of the blade there is an elongated projecting arm 73 which is provided with a hole 74 at its end remote from the blade.

The assembled blades are mounted on a pivot pin passed through the holes 74 in the arms 73.

Between the sides of the blades opposite to the cutting edges and the adjacent jaw there is provided a block of rubber 75 (not shown in FIG. 1) which serves to urge resiliently all the blades into the cutting position.

It will be appreciated that initial closing movement of the lever 24 towards the handle portion 13 causes the link 52 to swing about its pivot 57 whilst the links 50, 51 act to displace the jaw 17 towards jaw 10. During this initial closing movement of the jaws link 51 travels substantially in a straight line and the link 50 pivots at its ends.

The geometry of the three link arrangement is therefore one in which the link 52 travels beyond a line perpendicular to the length of link 51 during its initial closing movement.

Spring 70 is a compression spring of substantially greater value than spring 35, and spring 70 resists possible movement of pivot 57 during the initial closing movement so that at this stage, link 52 only pivots about point 57.

The closing movement continues until the cutting portions 30 penetrate the cable and essentially until the serrated surfaces 12, 19 grip the cable, but the individual blades conform to the cable cross section, being urged by the blocks 75 against the resistance of the cable.

The resistance to deformation of the cable sheath limits and ultimately prevents further closing movement of the jaws and when the cable is properly gripped and the sheath part-severed (this also depending upon the geometry of the linkage) the first part of the action is terminated (called the transition point) and the continued handle 24 movement towards the portion 13 results in all three links swinging relative to one another and in a toggle action whereby the end of link 52 adjacent to the spring 70 moves downwardly toward the extension 42 thus drawing the rod 40 axially and hence drawing the jaws 25, 26 away from the inwardly directed extensions 11, 18 of the jaws 10, 17.

This results in the end portion of the cable sheath being torn and stripped from the wire or other core of the cable.

The geometry of the linkage is further such that during the whole of the movement from the illustrated position of the handle 24 to a position where it is parallel with handle portion 13 when the jaws are closed upon the cable, links 50 and 51 do not travel beyond a straight line position, that is a position in which pivots 55, 53, 56 lie in a straight line. This in fact applies to all of the links, considered in pairs, that is links 50, 52 only move from the illustrated position to a more acute angle of one to the other and links 51, 52 move to a greater angle of one with respect to the other, without any pair of links going "over center."

It will also be appreciated that in practice a single squeezing together of levers 13, 24 is a single action resulting in first gripping and then stripping of the cable with the transition between the two stages of the action taking place automatically.

The tool in practice may operate, with the screw 60 in any one position, upon a range of cable sheath overall diameters and cable core diameters without any adjustment being necessary.

However the purpose of the screw 60 is to enable the tool to be used with an even wider range of cable diameters and core diameters.

The shank 66 of the screw has a fine thread so that the end is advanced a few thousandths of an inch only in each complete rotation, and any quarter revolution from one recess to the next will displace the jaw 26 relative to the jaw 17 so as to take the tool from a position in which it will cope with a first range of sizes of cable and core to a position in which it will cope with a second range of sizes, the second range overlapping the first range. Hence in the majority of cases, an operator of the tool will be able to use the tool at one setting of the screw for any of the different cable sizes with which the operator is working. The blade laminae further assist the tool to cope with a large range of sizes.

The face of the screwhead which is visible in the assembled position shown in FIG. 1 may be provided with indicia so as to enable the setting of the tool to be ascertained at a glance.

It will be appreciated that the single sided mechanism in which one jaw and one handle portion are rigid with respect to one another is particularly useful for installing as part of a cable stripping machine for power action since the displacement of handle 24 or an equivalent portion may be readily accomplished by a cam member, ram or the like.

In the alternative embodiment shown partly in FIG. 4 the arm on the blade is extended in the form of a U so that the free arm 76 of the U can abut the back of the rectangular casing and serve to urge the blade resiliently into the cutting position. Provided that the blade material has the required resilience then this arrangement obviates the need for any additional resilient means.

It will be appreciated that the distance between the cutting edge 72 and the adjacent portion 17 of the blade determines the possible depth of cut which can be achieved by the cutting jaws and, in certain circumstances, this may be useful for preventing damage to the wire strands when the wire is being stripped. The ability for the jaws to cut into a covering is to some extent limited by the fact that the force is derived from the resilient material although this can, to some extent, be compensated by the use of the screw adjuster 60.

It will be appreciated that the present invention provides a means for increasing the versatility of the tools described. Thus whilst in many applications jaws of fixed configuration may give satisfactory resilience, in certain cases, particularly when it is desired to strip a number of wires simultaneously, the jaw of the present invention is particularly convenient. It is possible for the jaws to be interchangeable with the jaws of fixed configuration.

The present invention is particularly useful for tools which are bench-fixed and which have wider jaws than handtools since the bench-fixed tools are more frequently used for stripping a number of wires simultaneously.

I claim:

1. A tool for stripping the sheath from a wire cable, comprising, in combination, a pair of jaws for receiving the cable therebetween in a predetermined position, each jaw comprising a stack of laminae, the individual laminae of each stack being positioned for face-to-face contact, each lamina having a cutting projection, all of the cutting projections located in a common plane which is normal to the axis of the wire when received between said jaws in said predetermined position, means for closing said jaws together for the projections to cut into the cable, and resilient means for acting on each stack of laminae permitting relative movement of the individual laminae sufficiently that said laminae are conformable to a cross section of a cable to be stripped and the projections penetrate through a sheath around said cable's periphery, means for moving said pair of jaws axially along said cable's length, and additional jaws for grasping said cable and for holding said cable in a substantially stationary position during said pair's axial movement.

2. A tool for stripping the sheath from a wire cable, comprising, in combination:
 i. a first pair of jaw means for gripping the sheath;
 ii. lever handle means for closing the first pair of jaws;
 iii. a second pair of jaw means mounted between the first pair of jaws, each of the second pair of jaw means comprising a plurality of laminae mounted in a face-to-face abutment position and disposed so that one of the parallel planes containing the laminae also contains an axis of a wire cable located in operative position between the second pair of jaw means;
 iv. a cutting projection on each of the laminae, said cutting projections lying in a common plane normal to the axis of said cable wire when in a sheath stripping position;
 v. resilient means located between each of the first pair of jaw means and the adjacent one of the second pair of jaw means, said resilient means resisting displacement of the laminae and permitting individual relative movement of the same to conform to the cross section of the cable wire;
 vi. and means for displacing the first jaw means relative to the second jaw means by continued operation of said handle means after the first jaw means have been closed.

3. A device for stripping the sheath from a wire, comprising, in combination, a first blade means having a first inwardly directed cutting edge; clamping means comprising opposing jaw means including a pivoted jaw and an opposite jaw for grasping a sheathed wire therebetween and for imparting to said edge a sheath stripping movement axially along said wire, said clamping means including a handle means for reciprocating movement of said pivoted jaw toward and away from said opposite jaw responsive to reciprocating movement of said handle means and for imparting said axial movement between opposite movements of the reciprocating movement of said pivoted jaw, an extension of said opposite jaw extending axially toward said handle means, said pivoted jaw also extending axially toward the extension of the opposite jaw and pivotally mounted on said extension, and a shaft means extending axially to said extension; said first blade means being pivotally attached to said shaft means and being mounted between said pivoted jaw and said opposite jaw with one of said jaws abutting a noncutting edge of said first blade means sufficiently to urge forward said cutting edge toward the other jaw, and said first cutting edge extending substantially parallel to said axial movement and extending between about said pivoted jaw and said handle means; said shaft means being mounted on at least one of said jaws for said axial movement along the extension of the opposite jaw sufficiently for imparting to said axial movement of said first blade means to-and-fro axial directions relative to said jaw means, said to-and-fro movement being responsive to said reciprocating movement of the handle means; spring means mounted to act against an abutment on said shaft means and oppositely against said clamping means for resisting said axial movement of said first blade means and for returning said first blade means to an extended position; said clamping means further including a toggle lever, a first lever of said toggle lever being pivotally mounted on said handle means at about the distal end of the first lever, a second lever of the toggle lever at about the distal end of the second lever being pivotally mounted on the extension of the opposite jaw, and a third lever of said toggle lever at about the distal end of the third lever being pivotally mounted on said pivoted jaw; a second blade means having a second cutting edge about parallel to the first cutting edge, said second blade means being pivotally mounted whereby the second cutting edge is urged toward the first cutting edge by the other jaw when the first cutting edge is urged forward; a resilient spring means mounted against the opposing first and second cutting edges for resisting movement of the edges toward each other and for returning the edges to an open-jaw position; an adjustable pressure means mounted on at least one of the jaws for regulating and determining the relative distance of one of the blade means from an abutting jaw; and at least one of said blade means including a plurality of blades having cutting edges in substantially parallel relationship to one another, a substantially horizontal cutting edge and another substantially vertical cutting edge relative to the axial extension of the jaw, said first and second cutting edges extending in a direction substantially parallel to the axial extension of the jaw.